United States Patent [19]

D'Amico et al.

[11] Patent Number: 5,127,100
[45] Date of Patent: Jun. 30, 1992

[54] DIGITAL RADIO COMMUNICATION SYSTEM AND TWO WAY RADIO

[75] Inventors: Thomas V. D'Amico, Boca Raton; Brian K. A. Johnson, Plantation, both of Fla.

[73] Assignee: Motorola, Inc., Schaumburg, Ill.

[21] Appl. No.: 343,975

[22] Filed: Apr. 27, 1989

[51] Int. Cl.⁵ .............................. H04Q 7/00
[52] U.S. Cl. ................... 455/33.1; 455/34.1; 455/51.1; 455/56.1; 370/84; 379/60
[58] Field of Search ............ 455/33, 54, 56, 34, 455/51; 375/7; 370/84; 379/59, 60

[56] References Cited

U.S. PATENT DOCUMENTS 4,731,783  3/1988  Fontanes .................. 370/84
4,763,322  8/1988  Eizenhofer ................ 370/84
4,816,820  3/1989  Davis ....................... 370/84

Primary Examiner—Donnie L. Crosland
Attorney, Agent, or Firm—Pedro P. Hernandez; Daniel K. Nichols

[57] ABSTRACT

A digital radio communication system includes a plurality of cells for providing two-way digital radio communication. Each of the cells utilizes communication frames having at least one inbound communication slot and at least one outbound communication slot. The frames of each cell are of uniform length. At least some of the cells have different bit rates than other cells. Information about the contiguous cells is provided to the radios operating within a cell. The radio includes a memory for storing information on adjacent cells and the radio can evaluate the signal of adjacent cells for determining an appropriate cell for hand-off purposes.

16 Claims, 3 Drawing Sheets

IN BUILDING 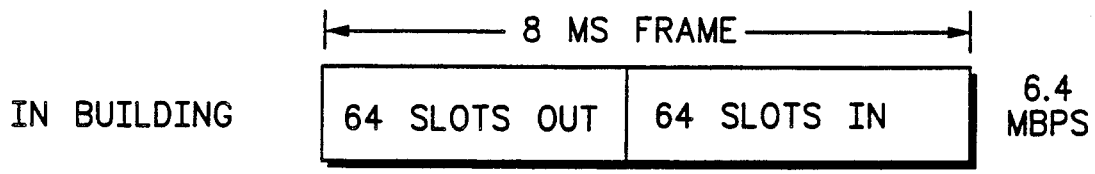
*FIG.3A*
VERY HIGH CAPACITY 
*FIG.3B*
HIGH CAPACITY 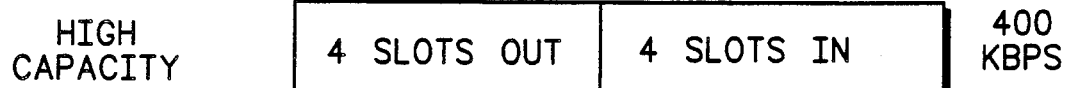
*FIG.3C*
MEDIUM CAPACITY 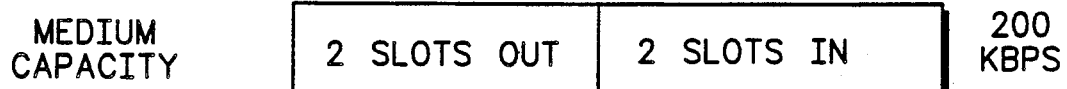
*FIG.3D*
LOW CAPACITY 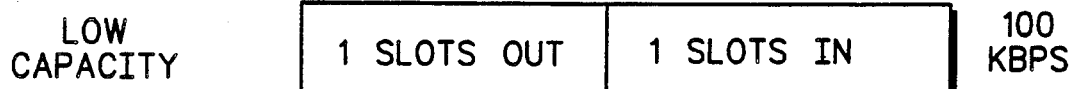
*FIG.3E*
*FIG.3*

DIGITAL RADIO COMMUNICATION SYSTEM AND TWO WAY RADIO

BACKGROUND OF THE INVENTION

This invention relates to two-way radio communications systems in generally and particularly to a system in which communication cells can have different operating characteristics.

In a conventional cellular type two-way radio communication system, when a roving radio such as a portable or mobile radio moves from one location to another it is often necessary to transfer or hand-off the radio from one cell to another. In a cellular type system, rather than having a single universal coverage area, smaller areas or cells are covered by one or more base stations. Typically adjacent cells operate on different frequencies to avoid interference. In conventional cellular telephone systems, as a roving station moves between cells, it is necessary for a central controller to instruct the roving radio as to which frequency it should move in order to access another cell for reliable communication. In order to do so, the control station has to determine which cell has the best communication with the roving station. This is done essentially by a voting arrangement where different cell receivers report on the strength or quality of the roving radio signal and the central station accordingly assigns the roving station to a communication cell. While such an approach does provide for cell hand-off, it requires a substantial intrastructure investment and complexity. There must be receivers for determining received signal strength at each cell, all of which must be linked back to a central station, which must determine the appropriate cell for communication with the roving station. It would be desirable for the roving station to make the cell hand off determination thereby, obviating the substantial infrastructure investment required for the decision to made by the control station.

SUMMARY OF THE INVENTION

The digital radio communication system and two-way digital radio includes a plurality of cells having different operating characteristics. Means are for provided a roving station to determine which of adjacent cells are suitable for radio communication.

The communication system includes a plurality of cells for providing two-way digital radio communication. In one aspect of the invention, each of the cells utilize communication frames having at least one inbound communication slot and at least one outbound communication slot. The frames of each cell are preferably synchronized and uniform in length. At least one of the cells has a data rate differing from that of another of the cells. In another aspect of the invention, at least one of the cells has a frame having more slots than the frame of another of the cells. In another aspect of the invention, the number of bits of each the slots is the same regardless of the bit rate.

In an aspect of the invention, the communication system includes a plurality of cells, at least some of which have different operating characteristics. A digital radio operating in one of the cells is providing information about the operating characteristics of cells contiguous or adjacent to the cell. In other aspects of the invention, the operating characteristics can include frequency of operation, bit rate, and/or communication slot information.

A two-way digital radio for use in a communication system, includes memory means for storing information on the frequency bit rate and time slot assignment of adjacent cells. The radio includes signal evaluation means for evaluating the signals of adjacent cells. In one aspect of the invention, the radio includes means for adjusting the radio receiver characteristics based upon stored bit rate information when evaluating a signal. In another aspect of the invention, the radio includes means for transmitting identification of an adjacent cell having an acceptable signal characteristic.

BRIEF DESCRIPTION OF THE DRAWINGS

FIGS. 3A–3E are diagrams of the frames and slots for different radio cells.

DESCRIPTION OF THE PREFERRED EMBODIMENT

Figure 1:
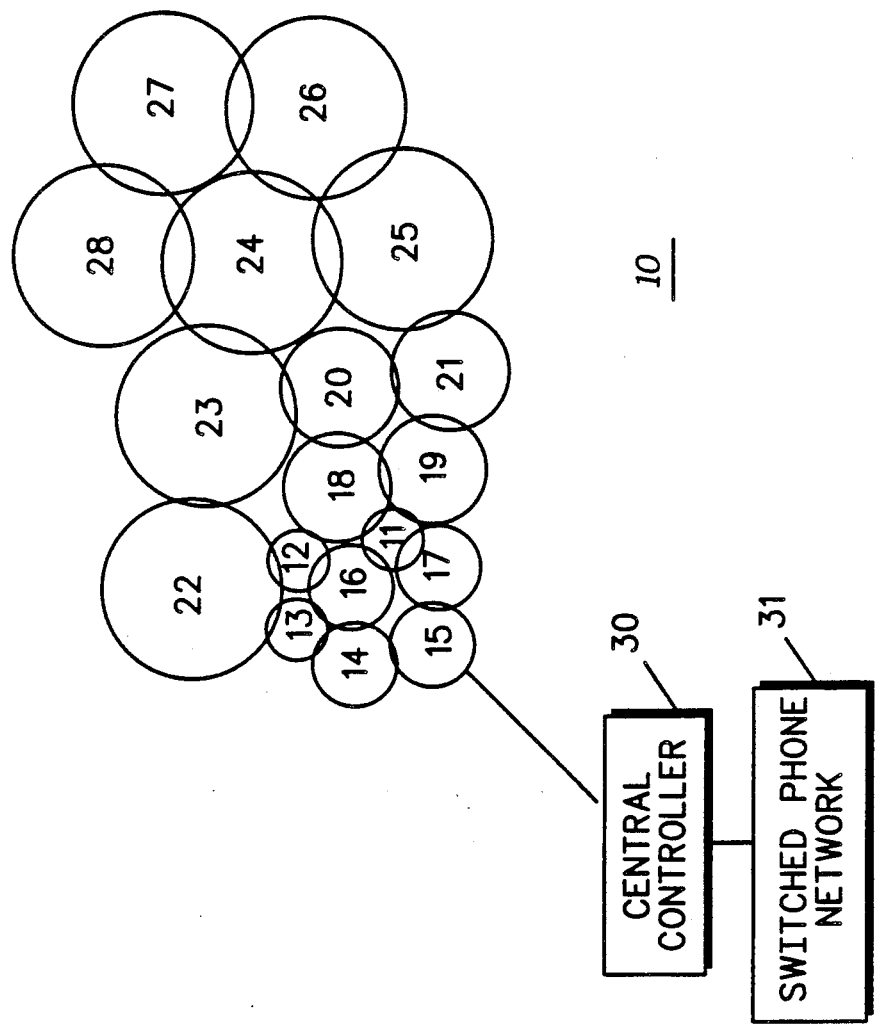
FIG. 1 is a coverage diagram of a radio communication system in accordance with the present invention.

Referring now by characters of reference to the drawings and first to FIG. 1, it would be understood that the radio communication system 10 includes a plurality of cells 11–28 each of which includes one or more base stations for two-way communication with radios within the range of that cell. In the system, various size cells are provided. Each of the cell stations communicates with a central controller 30 as for example by wire, fibre-optics, or radio links. The central controller 30 can provide the interconnect between the communication system 10 and the telephone network 31 permitting two-way communication between a conventional telephone system and radios operating within the radio system.

The communication system 10 is a digital system, where voice or data messages are transmitted in digital, preferably binary form, rather than as analog signals. In a digital radio system, the speed or bit rate at which information can be reliably transmitted is, to some extent, determined by the range of coverage to a base station. Typically, the larger the range of coverage or cell size, the lower the bit rate must be for reliable communication. This is due to fading, multipath time delay spread, and other interference conditions that exist in a practical system. As a consequence, high density communications traffic areas can best be covered by smaller cells which may support higher data rates and consequently, higher data throughput than larger cells which are used to cover areas of less dense communications traffic.

In the system 10, all of the cells 11–28 utilize the same data frame, as for example, an 8 millisecond frame. The various frames are illustrated in FIGS. 3A–3E. The first half of each frame can be the outbound portion and the second half the inbound portion. The outbound portion is the time during which data is transmitted from the various cell base stations to the roving radios. The inbound period is utilized for transmission by the various roving radios to the cell base stations. As such, the system is a time division multiple access system (TDMA). The inbound and outbound portions of each frame can be further subdivided into slots which for example can correspond to communication to or from a particular radio within the cell. Preferably, the slots each contain the same number of bits regardless of the data rate. This means that the frames having the highest data rate will have more slots than those frames or cells where transmission is at a lower data rate.

The very smallest cells 11-13 can correspond to a cell designed to cover a single building or portion of a building. In this case, it may be possible to transmit data a rate of 6.4 mbps and have 64 inbound and 64 outbound slots as illustrated in FIG. 3A. The next size larger cells 14-17 could be a very high capacity cell and transmit data at 1.6 mbps, thereby providing 16 inbound and outbound slots as illustrated in FIG. 3B. The next larger cells 18-19, which are high capacity cell covering a larger area, can be transmitting data at 400 kbps and have four inbound and four outbound slots as illustrated in FIG. 3C. Medium capacity cells 20-21 may only have two inbound and two outbound slots for transmitting data at 200 kbps as illustrated in FIG. 3D. Low capacity cells 22-28 may only have single inbound and outbound slots during the 8 millisecond frame and transmit data at 100 kbps as illustrated in FIG. 3E.

It is, of course, necessary to avoid interference between cells. There are two approaches to avoiding interference, both of which can be used simultaneously in the system 10. The first approach involves utilizing different frequencies for the individual cells (FDMA). However, as the number of cells increase, it may not be possible to obtain a sufficient number of frequencies to accommodate all of the cells. Also such approach may be very inefficient from a frequency use perspective. Frequency reuse can be utilized for remote cells but in some instances, time division multiplexing of the cells, can also be utilized. For example, it may be desirable for individual buildings to have their own cells. At the high data rate used in the building, the frequency may be underutilized. The same frequency can be used by adjacent or remote cells provided that the cells do not utilize the same time slots. For example, cell 12 can use the first 32 inbound and outbound slots while cell 11 can use the last 32 inbound and outbound slots of a frame. The number of cells which could utilize the same frequency by utilizing different slots, is limited only by the required number of slots for individual cells. The operating characteristics of cells 11-28 need not be fixed. They can be dynamically changed under the control of central controller 30 based upon communication requirements. The frequency, bit rate and/or time slots of one or more cells can be independantly controlled.

Figure 2:
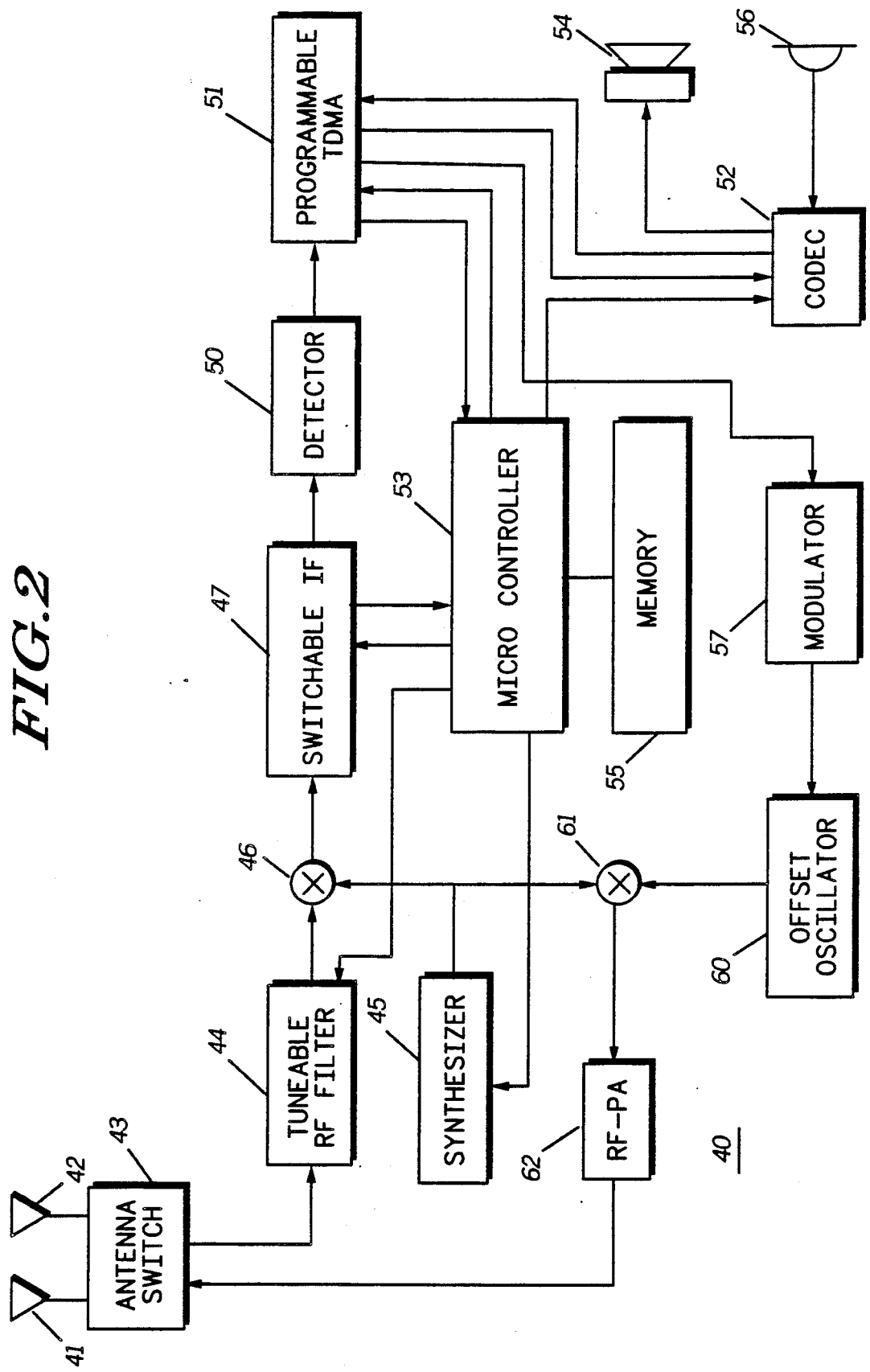
FIG. 2 is a block diagram of a digital two-way radio in accordance with the present invention.

A radio 40 suitable for use in system 10 is illustrated in FIG. 2. For reliability, the radio 40 includes a pair of antennas 41, 42 with a diversity antenna switch 43 to select the antenna having the best reception, as well as providing T/R switching. The output of the antenna switch 43 is supplied to a RF filter 44 having a variable center frequency and bandwidth.

The output of a frequency synthesizer 45 is applied to a mixer 46 for mixing the RF signal output of filter 44 down to an IF frequency. The IF signal is applied to a switchable IF section 47 that has a selectable bandwidth and also has a received signal strength (RSSI) output. The bandwidth of IF 47 is set based upon the data rate of the signal that is being received. The IF data signal is then passed to a detector 50 and then to a programmable TDMA 51 which unpacks the data from the appropriate received outbound data slot. Different parts of the data are then applied to a codec 52 and micro controller 53. The codec 52 translates digital voice data to analog format to drive speaker 54. Control and information data supplied to micro controller 53 can be stored in a memory 55.

For voice transmission, audio from a microphone 56 is applied to the codec 52 and then to the programmable TDMA circuit 51. Control and information data from micro controller 53 is also applied to the programmable TDMA circuit 51 which packs the digital data into the appropriate inbound slot for transmission. The data is applied to modulator 57 and then to offset oscillator 60. The output of offset oscillator 60 is mixed with the output of synthesizer 45 in mixer 61. The output of mixer 61 is applied to RF-PA 62 for transmission by the diversity antennas 41 and 42.

The microprocessor controller 53 constitutes control means for controlling the various radio functions. The memory 55 can include RAM and ROM for program storage and usage.

The radio 40 regularly checks the signal strength of adjacent cells. As the radio 40 is moved, whether it is a portable or mobile type radio, the received signal strength will change. The micro controller 53 monitors the RSSI output of switchable IF 47. If the radio 40 determines that another cell has a higher signal strength for a period of time, the radio requests service from that cell. In order for the radio to scan adjacent cells, it has to know the frequencies of operation of the cells and their bit rate, and preferably the time slots of operation. If a particular cell is not operating during all of the outbound slots, it is desirable for the radio to known during which slots it can look for a signal from that cell. The bit rate information is important because if the adjacent cell is operating at a different bit rate, the radio must be able to switch its IF filter to pass the signal so that a determination of signal strength can be made and cell ID can be received.

In operation whenever a radio 40 begins communication within a particular cell, information on all of the adjoining or contiguous cells which are available for handoff is transmitted to the radio. This information is stored in memory 55 for use in scanning adjacent cells. For example, if the radio 40 is operating in cell 18, the radio would scan the adjoining cells 11, 12, 16, 21, 23, 24 and 25 utilizing the RSSI output to evaluate the signal strength of those cells. The micro controller 53 would store and compare the received signal strengths and decode and store the address transmitted by each of the adjacent cells. Once the optimum cell is determined by the radio, the desired new cell identification is transmitted during the radio's inbound slot in its current cell 18 along with a request for transfer to the new cell (e.g. cell 16). The cell 18 base station would relay the information to central controller 30 which would then reroute the communication to cell 16 and transmit through cell 18 a command advising the radio 40 on which slot to use in the new cell. The selection of cells during the hand-off process is then essentially controlled by the individual radio 40 which the central controller 30 only handling the rerouting of the communication rather than the cell selection.

We claim as our invention:
1. A digital radio communication system for use with digital radios comprising:
a plurality of cells each including at least one base station having a transmitter and receiver for providing two-way digital radio communication with said digital radios, the base station of each of the cells communicate with the digital radios using communication frames that have at least one in- bound communication slot and at least one outbound communication slot in order to communicate with the digital radios, the at least one inbound slot is used by the base station receiver for receiving information from one of the digital radios and the at least one outbound slot is used by the base station transmitter for transmitting information to at least one of the digital radios, the communication frames of each of the plurality of cells are uniform in length, a first of said cells having a base station transmitter data rate differing from at least a second of said cells base station transmitter data rate.

2. A digital radio communication system as defined in claim 1, in which the data rate of said first cell is greater than the data rate of said second cell, said first cell having more communication slots per frame than of said second cell.

3. A digital radio communication system as defined in claim 1, in which the inbound communication slot of said first cell includes the same number of bits as the inbound communication slot of said second cell.

4. A digital radio communication system as defined in claim 1 in which the out-bound communication slot of said first cell includes the same number of bits as the out-bound communication slot of said second cell.

5. A digital radio communication system for use with a digital radio, the digital radio communication system comprising:
　a plurality of cells each including at least one base station, at least some of the base stations having different operating characteristics,
　and the base station in each of the cells including a transmitter means for providing information to the digital radio, the transmitter means of the base station corresponding to the cell the digital radio is currently operating in transmits information to the digital radio about the operating characteristics of the base stations of cells contiguous to the cell the digital radio is currently operating in.

6. A digital radio communication system as defined in claim 5, in which the different operating characteristics include frequency of operation.

7. A digital radio communication system as defined in claim 5, in which the different operating characteristics include bit rate.

8. A digital radio communication system as defined in claim 5, in which the different operating characteristic include communication slot information.

9. A digital radio communication system as defined in claim 5, in which the different operating characteristics include frequency of operation and bit rate.

10. A digital ratio communication system as defined in claim 5, in which the different operating characteristics include frequency of operation and communication slot information.

11. A digital radio communication system as defined in claim 5, in which the different operating characteristics include bit rate and communication slot information.

12. A digital radio communication system as defined in claim 5, in which the different operating characteristic include frequency of operation, bit rate and communication slot information.

13. A digital radio communication system as defined in claim 5, includes means for controlling the operating characteristics of at least one of the cells.

14. A two-way digital radio for use in a communication system having adjacent cells to the cell the digital radio is currently operating in, the cells having base stations, the base station of the cell the digital radio is currently operating in transmits data to and receives data from the digital radio, the adjacent cells base stations operate using different transmit and receive frequencies, different data transmission rates, and/or transmit data to the digital radio during different communication time slots, the two-way digital radio comprising:
　memory means for storing information received by the digital radio which has been transmitted by the base station of the cell the digital radio is currently operating in regarding the adjacent cells base stations transmit and receive frequencies, the adjacent cells base stations data transmission rates, and the time slots during which the adjacent cells base stations transmit information, and
　signal evaluation means coupled to the memory means for evaluating the signals transmitted by the base stations of adjacent cells to the digital radio.

15. A two-way digital radio as defined in claim 14, further including means for adjusting radio receive characteristics based upon said stored bit rate information when evaluating a signal.

16. A two-way digital radio as defined in claim 14, further including means for transmitting identification of an adjacent cell having acceptable signal characteristics.

* * * * *